United States Patent [19]

Fierkens

[11] Patent Number: 5,647,472

[45] Date of Patent: Jul. 15, 1997

[54] AUTOMATIC PELLET FEEDING APPARATUS FOR USE IN FORMING ENCAPSULATED SEMICONDUCTOR CHIPS AND METHOD THEREFOR

[76] Inventor: Richard H. J. Fierkens, Keurbeck 15, 6914 AE Herwen, Netherlands

[21] Appl. No.: 668,239

[22] Filed: Jun. 21, 1996

Related U.S. Application Data

[63] Continuation of Ser. No. 230,306, Apr. 20, 1994, abandoned.

[51] Int. Cl.$^6$ ................................................. B65G 47/12
[52] U.S. Cl. ............................................ 198/443; 198/773
[58] Field of Search ................................. 198/443, 396, 198/750.1, 774.1, 773

[56] References Cited

U.S. PATENT DOCUMENTS

| | | | |
|---|---|---|---|
| 2,728,443 | 12/1955 | Pike, Jr. et al. | 198/443 X |
| 3,088,577 | 5/1963 | Chamberlin | 198/443 |
| 3,155,218 | 11/1964 | Creed | 198/443 |
| 3,561,582 | 2/1971 | Smith | 198/443 X |
| 4,446,961 | 5/1984 | Klusmier | 198/443 |
| 4,936,736 | 6/1990 | Meier | 198/443 X |
| 5,174,351 | 12/1992 | Lindenblatt et al. | 198/774.1 X |
| 5,257,688 | 11/1993 | Fridlund | 198/443 |

FOREIGN PATENT DOCUMENTS

| | | | |
|---|---|---|---|
| 0105555 | 4/1984 | European Pat. Off. | 198/773 |
| 0663404 | 12/1987 | Switzerland | 198/773 |
| 0897675 | 1/1982 | U.S.S.R. | 198/774.1 |
| 0899414 | 10/1989 | U.S.S.R. | 198/774.1 |

*Primary Examiner*—D. Glenn Dayoan
*Attorney, Agent, or Firm*—Harry M. Weiss; Jeffrey Moy; Harry M. Weiss & Associates, P.C.

[57] ABSTRACT

An automatic pellet feeding apparatus and method for delivering plastic pellets to a plastic molding machine for encapsulating semiconductor chips stores a plurality of plastic pellets for ultimate delivery to the plastic molding machine. A stair like structure is provided for vertically moving the plastic pellets from a plastic pellet storage location to a conveyor which moves the plastic pellets to the plastic molding machine. The stair like structure has an arrangement of members which alternates between a movable member and a stationary member. The movable members are all moved up and down together, and when the movable members are down, plastic pellets may be loaded thereon from either the storage location or from an adjacent stationary member. Alternatively, when the movable members are up, plastic pellets may be off-loaded therefrom to either an adjacent stationary member or to the conveyor.

14 Claims, 3 Drawing Sheets

AUTOMATIC PELLET FEEDING APPARATUS FOR USE IN FORMING ENCAPSULATED SEMICONDUCTOR CHIPS AND METHOD THEREFOR

This is a continuation of application Ser. No. 08/230,306 filed on Apr. 20, 1994 now abandoned.

BACKGROUND OF THE INVENTION

1. Field of the Invention

This invention relates generally to apparatus and methods for producing semiconductor chips and, more specifically, to an automatic pellet feeding apparatus and method for delivering plastic pellets to a plastic molding machine for encapsulating semiconductor chips.

2. Description of the Related Art

Automatic molding machines for use in encapsulating semiconductor chips are fed plastic pellets or compressed compound (epoxy) pellets which are heated and subsequently compressed by a plunger. The plunger forces the molten plastic fluid through a conduit and into a cavity having a semiconductor chip therein, thereby encapsulating the semiconductor chip. Typically, the plastic pellets have a generally cylindrical shape, and they are placed with their side in contact with a conveyor belt which delivers the plastic pellets to the automatic molding machine.

In the past, the plastic pellets were delivered from a pellet storage bin to the conveyor belt using a vibration type platform in the following manner. The plastic pellets were forced through a mechanically constrained channel and onto the conveyor belt. The agitation of the plastic pellets caused by the vibrating platform would help to properly align the pellets so that they may move through the constrained channel and onto the conveyor belt in the required in-line position. The vibrating platform approach has several disadvantages. For example, the vibration raises dust and other debris. Additionally, the agitation of the vibration platform sometimes damages the plastic pellets.

Therefore, there existed a need to provide an automatic pellet feeding apparatus that overcomes the shortcomings of the vibration platform type pellet feeding system.

SUMMARY OF THE INVENTION

In accordance with one embodiment of this invention, it is an object of this invention to provide an automatic pellet feeding apparatus for delivering plastic pellets to a plastic molding machine for encapsulating semiconductor chips.

It is another object of this invention to provide a method for delivering plastic pellets to a plastic molding machine for encapsulating semiconductor chips.

It is yet another object of this invention to provide an automatic pellet feeding apparatus for delivering plastic pellets to a plastic molding machine for encapsulating semiconductor chips that neither raises dust and debris nor damages the plastic pellets.

BRIEF DESCRIPTION OF THE PREFERRED EMBODIMENTS

In accordance with one embodiment of this invention, an automatic pellet feeding apparatus for delivering plastic pellets to a plastic molding machine for encapsulating semiconductor chips is disclosed comprising, in combination, storage means for containing a plurality of the plastic pellets for ultimate delivery to the plastic molding machine, delivery means coupled to the storage means for vertically moving the plurality of plastic pellets from the storage means, and conveyor means coupled to the delivery means for receiving the plurality of plastic pellets from the delivery means and for moving the plurality of plastic pellets to the plastic molding machine. The delivery means comprises a stair like structure having a plurality of movable and stationary members resembling a plurality of steps of the stair like structure, and each of the plurality of movable and stationary members have an upper surface to carry the plurality of plastic pellets when the plurality of plastic pellets are in a first position relative to the upper surface. The delivery means further comprises means for simultaneously and repetitiously moving each of the plurality of movable members up and down by a linear fixed amount such that when each movable member of the plurality of movable members is down, the plurality of plastic pellets may be loaded on any one movable member of the plurality of movable members, and, subsequently, when each movable member of the plurality of movable members is up, the plurality of plastic pellets on any one movable member of the plurality of movable members may be off loaded therefrom. The plurality of plastic pellets may be loaded from the storage means onto the upper surface of a lowest one of the plurality of movable members, and, in addition, the plurality of plastic pellets may be loaded from one of the plurality of stationary or fixed members onto the upper surface of one of the plurality of movable members. The plurality of plastic pellets may be off loaded onto one of the plurality of stationary members from the upper surface of one of the plurality of movable members, and the plurality of plastic pellets may be off loaded onto the conveyor means from the upper surface of a top one of the plurality of movable members. Note that each plastic pellet of the plurality of plastic pellets has a substantially cylindrical shape, and therefore, the first position relative to the upper surface is defined as having a lengthwise dimension of the substantially cylindrical shape of each plastic pellet of the plurality of plastic pellets in line with a lengthwise dimension of the upper surface. Also, note that each of the movable and stationary members of the delivery means repetitively alternates from a movable member to a stationary member such that the moving of the plurality of movable members up and down by the linear fixed amount causes the plurality of plastic pellets to move vertically from the storage means to the conveyor means via the stair like structure of the delivery means.

In accordance with another embodiment of this invention, a method for delivering plastic pellets to a plastic molding machine for encapsulating semiconductor chips is provided comprising the steps of providing storage means for containing a plurality of the plastic pellets for ultimate delivery to the plastic molding machine, providing delivery means coupled to the storage means for vertically moving the plurality of plastic pellets from the storage means, and providing conveyor means coupled to the delivery means for receiving the plurality of plastic pellets from the delivery means and for moving the plurality of plastic pellets to the plastic molding machine. The delivery means comprises a stair like structure having a plurality of movable and stationary members resembling a plurality of steps of the stair like structure, and each of the plurality of movable and stationary members has an upper surface to carry the plurality of plastic pellets when the plurality of plastic pellets are in a first position relative to the upper surface. The delivery means further comprises means for simultaneously and repetitiously moving the plurality of movable members up and down by a linear fixed amount such that when each movable member of the plurality of movable members is down, the plurality of plastic pellets may be loaded on any one movable member of the plurality of movable members, and, subsequently, when each movable member of the plurality of movable members is up, the plurality of plastic pellets on any one movable member of the plurality of movable members may be off loaded therefrom. The movable and stationary members of the delivery means are repetitively alternated from a movable member to a stationary member such that the moving of the plurality of movable members up and down by the linear fixed amount causes the plurality of plastic pellets to move vertically from the storage means to the conveyor means via the stair like structure of the delivery means.

The foregoing and other objects, features, and advantages of the invention will be apparent from the following, more particular, description of the preferred embodiments of the invention, as illustrated in the accompanying drawings.

DESCRIPTION OF THE PREFERRED EMBODIMENTS

Figure 1:
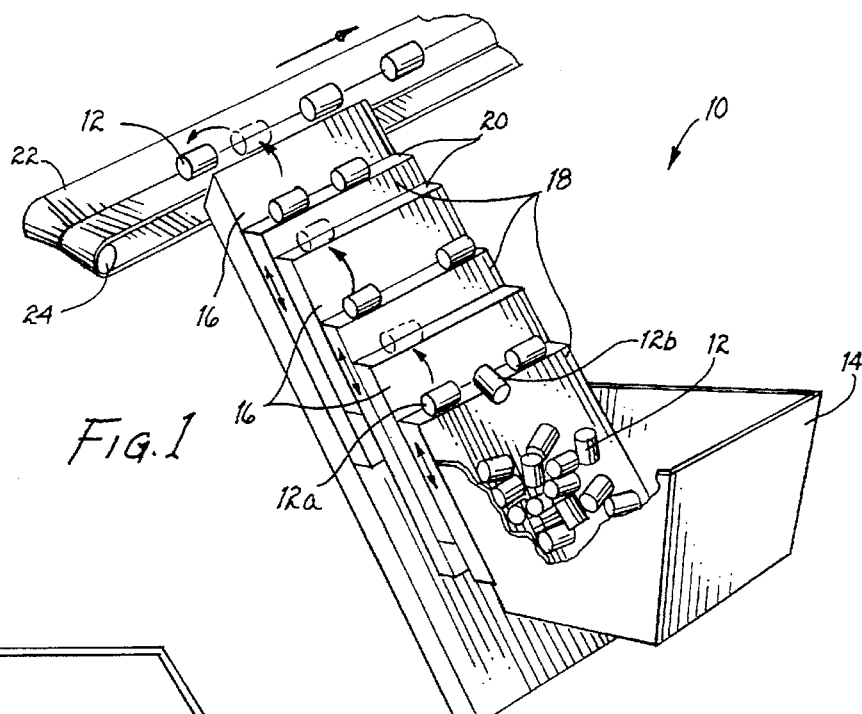
FIG. 1 is a perspective view of the automatic pellet feeding apparatus showing a plurality of plastic pellets being delivered from a plastic pellet storage location to a conveyor which subsequently delivers the plastic pellets to the plastic molding machine (not shown).
Figure 2:
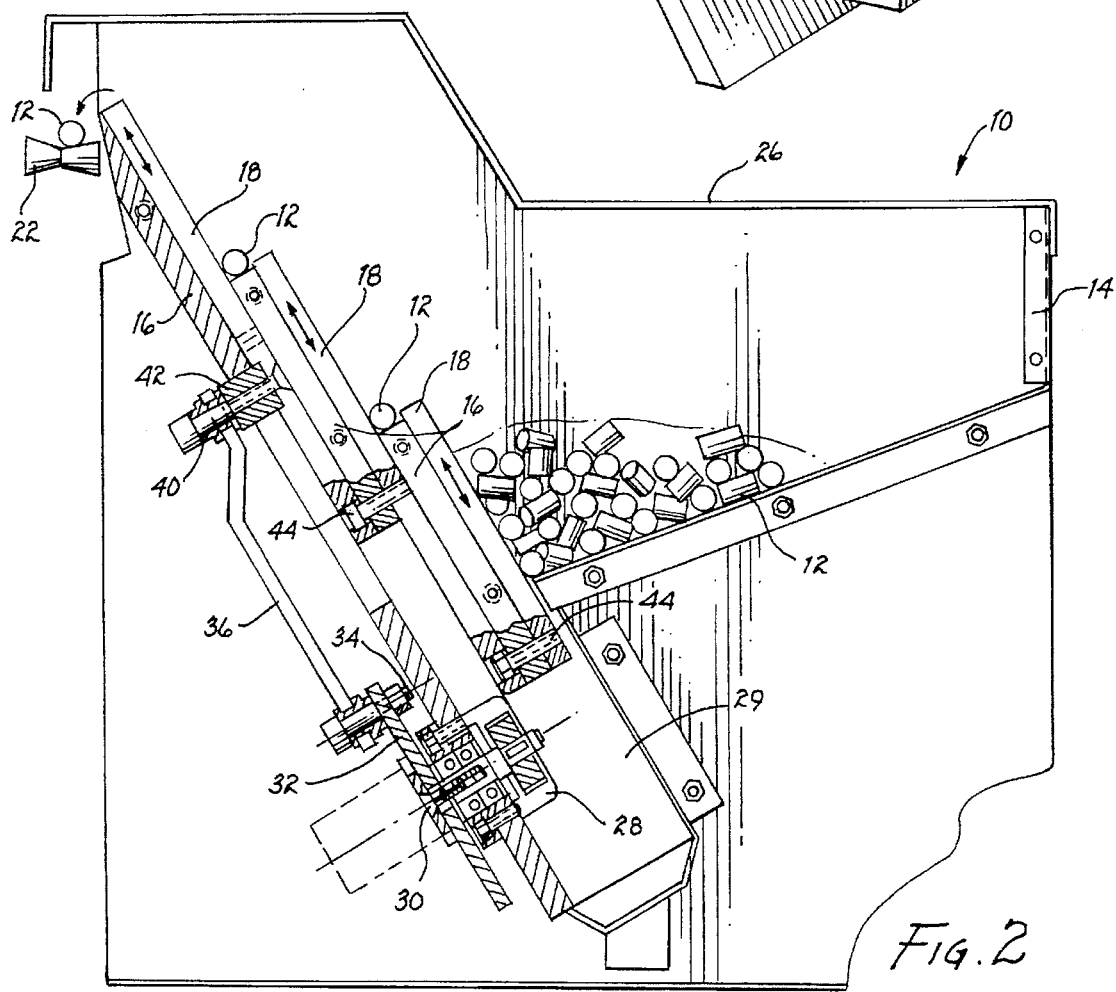
FIG. 2 is a cross sectional view of the automatic pellet feeding apparatus shown in FIG. 1.

Referring to FIGS. 1 and 2, the automatic pellet feeding apparatus, or more simply, the apparatus, is shown and is generally referred to by reference number 10. The apparatus 10 is used to deliver plastic pellets 12 to a plastic molding machine (not shown) for encapsulating semiconductor chips. The plastic pellets, or simply the pellets 12, are preferably made of a compresses plastic type compound or epoxy. Also note that the pellets 12 are nominally of a cylindrical shape, however, other suitable shapes may be implemented, if desired. The pellets 12 are contained in a storage bin 14.

The storage bin 14 is coupled to a stair like structure which will be referred to as the delivery structure. The delivery structure includes a plurality of fixed members 16, a plurality of movable members 18, and other elements required to support the delivery structure and to move the movable members 18. Note that the elements for supporting the delivery structure and for moving the movable members 18 are not shown in FIG. 1 for the sake of simplification of the drawing. Each of the fixed members 16 and movable members 18 have an upper surface 20 for carrying the pellets 12. Note that double ended arrows are shown on a side edge of the movable members 18 as an indication of the up and down movements of these members 18.

In FIG. 2, the elements for supporting the delivery structure and moving the movable members 18 are shown. In particular, the base 29 provides support for the delivery structure and for the storage bin 14. The base 29 supports the fixed members 16, and, in addition, an electric powered motor 28 is supported by the base 29. The motor 28 rotates a disc 32 via the motor axis 30. The disc 32 is eccentrically coupled to a shaft 34 which is coupled to a member 36. The member 36 is coupled to the top movable member 18 via the connector 40 and the connection bracket 42. Also note that each of the movable members 18 are coupled together by connectors 44 such that all of the movable members 18 move up and down together. It is well known to those skilled in the art that the rotational motion of the disc 32 will cause the eccentrically coupled shaft 34, the member 36, and each of the movable members 18 to move vertically up and down by a linear fixed amount. It is well known in the art that the portions of the connector 40, connection bracket 42, and each of the connectors 44 may be given space for movement through slots (not shown) within each of the fixed members 16, or, alternatively, the connector 40, connection bracket 42, and each of the connectors 44 may be given space for movement by simply locating them next to an outside edge of each of the fixed members 16. The apparatus 10 is coupled to a cover 26 for reducing the amount of dust and other debris that could potentially fall therein.

In FIG. 1, one of the pellets 12 is designated 12a in order to point out the importance of the relative position of this pellet 12a respect to the movable member 18 upon which it rests. In particular, the lengthwise dimension of the pellet 12a is in line with the lengthwise dimension of the upper surface 20 of the movable member 18. Similarly, as the pellet 12a is moved vertically up the delivery structure by each of the movable 18 and fixed 16 members, the lengthwise dimension of the pellet 12a is in line with the lengthwise dimension of the upper surface 20 of each of the movable 18 and fixed 16 members. This relative position of the pellet 12a is the desired relative position in order to move the pellet 12a up the delivery structure. Of course, the pellet 12a could be rotated by 180 degrees and still effectively maintain the same relative position in order to move the pellet 12a up the delivery structure to the conveyor 22. The conveyor 22 has a conveyor drive 24 for moving the conveyor 22 and the pellets 12 thereon to the plastic molding machine.

Occasionally, a pellet 12 which is picked up from the storage bin 14 may be in a relative position as shown for pellet 12b. This type of relative position of the pellet 12b with respect to the upper surface 20 of either a movable 18 or a fixed 16 member is undesired because the pellet 12b can not be moved up the delivery structure. This is evident from FIG. 1 which shows the pellet 12b falling from the upper surface 20 of the movable member 18 and back into the storage bin 14. The lengthwise dimension of the pellet 12b is not in line with the lengthwise dimension of the upper surface 20 of the movable 18 member, and consequently, the pellet 12b falls back into the storage bin 14.

OPERATION

Figure 3A:
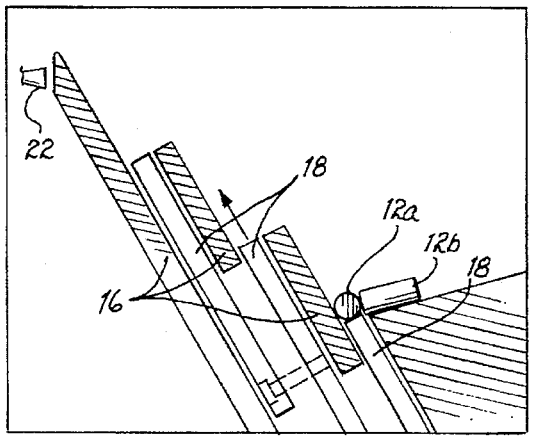
FIGS. 3a–3d are simplified cross sectional views of the automatic pellet feeding apparatus showing the sequence of steps for vertically moving a plastic pellet, in the proper position relative to the delivery structure, from the plastic pellet storage location up to the conveyor. These Figures also show a plastic pellet in an improper position relative to the delivery structure.
Figure 3B:
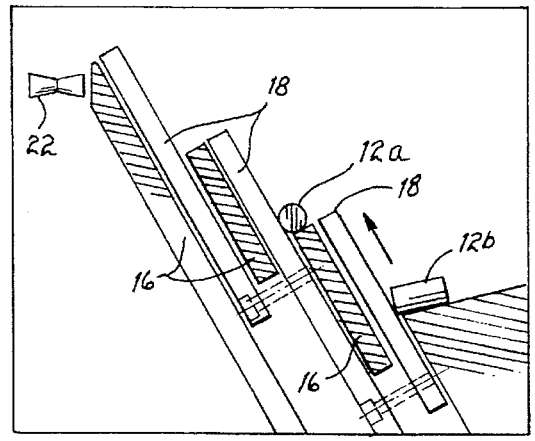
Figure 3C:
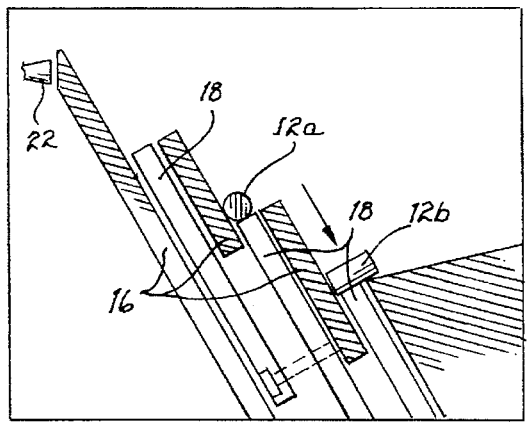
Figure 3D:
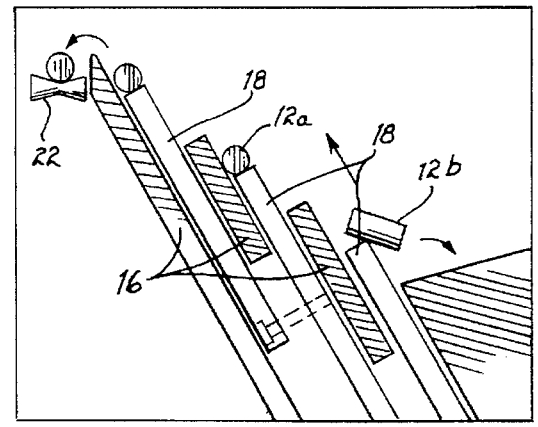

FIGS. 3a–3d are simplified cross sectional views of the apparatus 10. These Figures demonstrate the operation of the apparatus 10. In order to simplify the drawings, only two pellets 12a and 12b are shown in FIGS. 3a–3c, however, in practice several more pellets 12 would move up the delivery structure as shown in FIG. 3d.

Initially, the pellets 12 are contained in the storage bin 14. Referring back to FIG. 2, one notices that the base 29 is inclined with respect to the ground, and, consequently, the force of gravity tends to pull the pellets 12 in the storage bin 14 toward the delivery structure.

Recalling that when the motor 28 is running, the movable members 18 are driven, together, up and down by a fixed linear amount. For the purposes of this operational description, the movable members 18 will be referred to as the first, second, and third movable members 18, moving from the bottom to the top of the delivery structure. In a similar manner, the fixed members 16 will be called the first, second, and third fixed members 16 from the bottom to the top of the delivery structure. Please note that although a preferred embodiment of the apparatus 10 includes 3 movable members 18 and 3 fixed members 16, if desired, fewer or more than 3 movable members 18 and 3 fixed members 16 may be used.

Referring to FIG. 3a, as the force of gravity moves the pellets 12 in the storage bin 14 toward the delivery structure, a pellet 12a slides on top of the upper surface 20 of the first or bottom movable member 18 as this member 18 reaches the bottom of its travel. In FIG. 3b, recalling that the delivery structure is tilted with respect to the ground, as the first movable member 18 reaches the top of its travel, the force of gravity permits the pellet 12a to move onto the upper surface 20 of the first fixed member 16. In FIG. 3c, the movable members 18 have moved down again, and the pellet 12a moves from the upper surface 20 of the first fixed member 16 onto the upper surface 20 of the second movable member 18. Also, note that the pellet 12b has moved onto the upper surface 20 of the first movable member 18. In FIG. 3d, as the movable members 18 move up, the pellet 12b falls off of the first movable member 18 and back into the storage bin 14 because the pellet 12b is not in the proper relative position in order to permit this pellet 12b to move up the delivery structure. Note that two more pellets 12a are shown in FIG. 3d in order to demonstrate that several of these pellets 12a can simultaneously move up the delivery structure. The pellets 12a move up each of the movable 18 and fixed 16 members, in the manner discussed above, until the pellets 12a reach the top of the delivery structure and then roll onto the conveyor 22.

Figure 4:
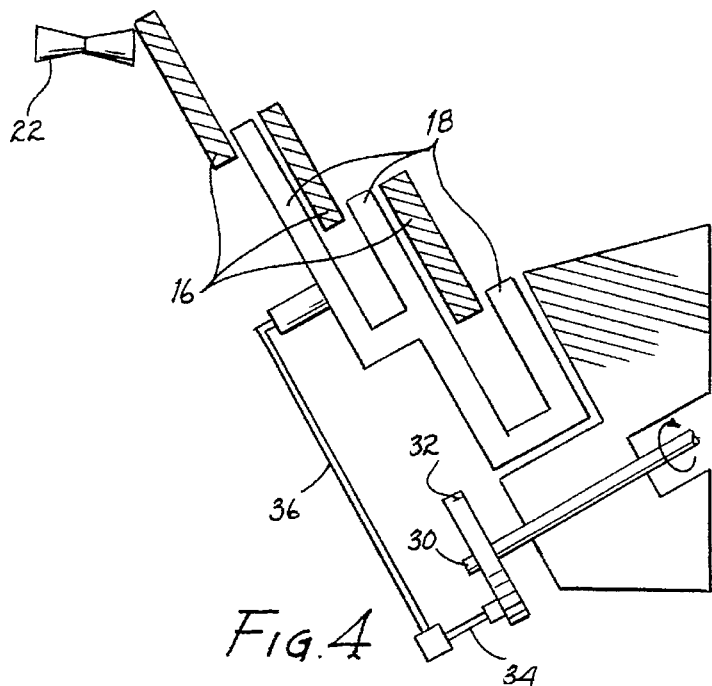
FIGS. 4 and 5 are simplified cross sectional views of the automatic pellet feeding apparatus showing the movable members being moved up and down by a rotational force.
Figure 5:
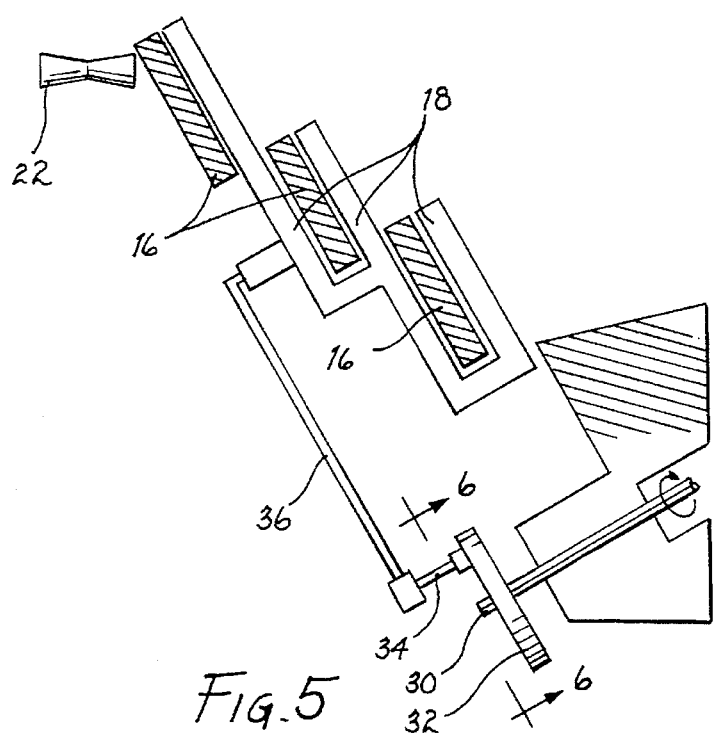

Referring to FIGS. 4 and 5, rotational arrows around the motor axis 30 signify the rotational motion of the motor axis 30 and the disc 32. As the disc 32 completes one revolution, the movable members 18 move from their fully down position as shown in FIG. 4 to their fully up position shown in FIG. 5. In short, as the motor 28 rotates the disc 32, the movable members 18, simultaneously and repetitiously, move up and down by a linear fixed amount such that when each movable member 18 is fully down, a plurality of plastic pellets 12 may be loaded on any one of the movable members 18. Subsequently, when each movable member 18 is fully up, the plurality of plastic pellets 12 on any one movable member 18 may be off loaded therefrom. The plurality of plastic pellets 12 are loaded from the storage bin 14 onto the upper surface 20 of a lowest one of the plurality of movable members 18. Similarly, the plurality of plastic pellets 12 are loaded from one of the plurality of fixed or stationary members 16 onto the upper surface 20 of one of the movable members 18. Conversely, the plurality of plastic pellets 12 may be off loaded onto one of the stationary or fixed members 16 from the upper surface 20 of one of the movable members 18. Also, the plurality of plastic pellets 12 are off loaded onto the conveyor 22 from the upper surface 20 of a top one of the movable members 18.

In general then, each of the movable 18 and stationary or fixed 16 members of the delivery structure repetitively alternates from a movable member 18 to a stationary member 16 such that the moving of the movable members 18 up and down by the linear fixed amount causes the plastic pellets 12 to move substantially vertical from the storage bin 14 to the conveyor 22 via the stair like delivery structure. The conveyor 22 then moves the pellets 12 to the plastic molding machine.

Figure 6:
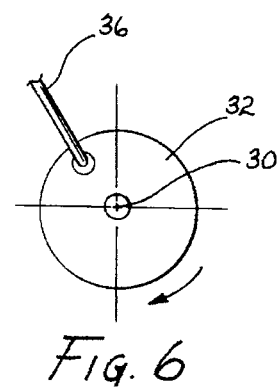
FIG. 6 is a cross sectional view taken along the line 6—6 of FIG. 5.

Referring to FIG. 6, the cross sectional view of the disc 32 shows that the member 36 is eccentrically coupled to the disc 32 via the shaft 34, and, consequently, as the disc 32 rotates, the movable members 18 are repetitively moved up and down by the fixed linear amount in order to move the pellets 12 vertically up the delivery structure.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. An automatic pellet feeding apparatus for delivering plastic pellets to a plastic molding machine for encapsulating semiconductor chips comprising, in combination:

storage means for containing a plurality of said plastic pellets for ultimate delivery to said plastic molding machine, each of said plurality of plastic pellets having a substantially cylindrical shape;

delivery means coupled to said storage means for vertically moving said plurality of plastic pellets several at a time from said storage means; and linear conveyor means having a linear recessed portion between slanted wall portions coupled to said delivery means for receiving said plurality of plastic pellets of substantially cylindrical shape from said delivery means and for linearly moving said plurality of plastic pellets of substantially cylindrical shape located on said linear recessed portion of said conveyor means to said plastic molding machine;

said delivery means comprising a stair like structure having a plurality of movable and stationary members resembling a plurality of steps of said stair like structure, each of said plurality of movable and stationary members having upper surface means comprising a flat surface having a length and width configuration dimensioned to carry said plurality of plastic pellets of substantially cylindrical shape when said plurality of plastic pellets of substantially cylindrical shape are in a first position relative to said upper surface means, said linear conveyor means being located adjacent a highest position of said stair like structure to transport away several of said plurality of plastic pellets at one time.

2. The apparatus of claim 1 wherein said delivery means further comprising means for simultaneously and repetitiously moving said plurality of movable members up and down by a linear fixed amount such that when each movable member of said plurality of movable members is down, said plurality of plastic pellets may be loaded on any one movable member of said plurality of movable members and subsequently when each movable member of said plurality of movable members is up, said plurality of plastic pellets on any one movable member of said plurality of movable members may be off loaded therefrom.

3. The apparatus of claim 2 wherein said plurality of plastic pellets are loaded from said storage means onto said upper surface means of a lowest one of said plurality of movable members.

4. The apparatus of claim 2 wherein said plurality of plastic pellets are loaded from one of said plurality of stationary members onto said upper surface means of one of said plurality of movable members.

5. The apparatus of claim 2 wherein said plurality of plastic pellets are off loaded onto one of said plurality of stationary members from said upper surface means of one of said plurality of movable members.

6. The apparatus of claim 2 wherein said plurality of plastic pellets are off loaded onto said conveyor means from said upper surface means of a top one of said plurality of movable members.

7. The apparatus of claim 2 wherein said movable and stationary members of said delivery means are located adjacent one another and alternate from a movable member to a stationary member such that said moving of said plurality of movable members up and down by said linear fixed amount causes said plurality of plastic pellets to move vertically from said storage means to said conveyor means via said stair like structure of said delivery means.

8. A method for delivering plastic pellets to a plastic molding machine for encapsulating semiconductor chips comprising the steps of:

providing storage means for containing a plurality of said plastic pellets for ultimate delivery to said plastic molding machine, each of said plurality of plastic pellets having a substantially cylindrical shape;

providing delivery means coupled to said storage means for vertically moving said plurality of plastic pellets from said storage means; and providing linear conveyor means having a linear recessed portion between slanted wall portions coupled to said delivery means for receiving said plurality of plastic pellets of substantially cylindrical shape from said delivery means and for linearly moving said plurality of plastic pellets of substantially cylindrical shape located on said linear recessed portion of said conveyor means to said plastic molding machine;

said step of providing said delivery means comprises the step of providing a stair like structure having a plurality of movable and stationary members resembling a plurality of steps of said stair like structure, each of said plurality of movable and stationary members having upper surface means comprising a flat surface having a length and width configuration dimensioned to carry said plurality of plastic pellets of substantially cylindrical shape when said plurality of plastic pellets of substantially cylindrical shape are in a first position relative to said upper surface means, said linear conveyor means being located adjacent a highest position of said stair like structure to transport away several of said plurality of plastic pellets at one time.

9. The method of claim 8 wherein said delivery means further comprising means for simultaneously and repetitiously moving said plurality of movable members up and down by a linear fixed amount such that when each movable member of said plurality of movable members is down, said plurality of plastic pellets may be loaded on any one movable member of said plurality of movable members and subsequently when each movable member of said plurality of movable members is up, said plurality of plastic pellets on any one movable member of said plurality of movable members may be off loaded therefrom.

10. The method of claim 9 wherein said plurality of plastic pellets are loaded from said storage means onto said upper surface means of a lowest one of said plurality of movable members.

11. The method of claim 9 wherein said plurality of plastic pellets are loaded from one of said plurality of stationary members onto said upper surface means of one of said plurality of movable members.

12. The method of claim 9 wherein said plurality of plastic pellets are off loaded onto one of said plurality of stationary members from said upper surface means of one of said plurality of movable members.

13. The method of claim 9 wherein said plurality of plastic pellets are off loaded onto said conveyor means from said upper surface means of a top one of said plurality of movable members.

14. The method of claim 9 wherein said movable and stationary members of said delivery means are located adjacent one another and alternate from a movable member to a stationary member such that said moving of said plurality of movable members up and down by said linear fixed amount causes said plurality of plastic pellets to move vertically from said storage means to said conveyor means via said stair like structure of said delivery means.

* * * * *